United States Patent
Kitahara (10) Patent No.: US 7,661,877 B2
(45) Date of Patent: Feb. 16, 2010

(54) THERMAL FLOW DETECTING APPARATUS AND METHOD FOR DETECTING FLOW USING THE SAME

(75) Inventor: Noboru Kitahara, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 145 days.

(21) Appl. No.: 11/727,814

(22) Filed: Mar. 28, 2007

(65) Prior Publication Data

US 2007/0242725 A1   Oct. 18, 2007

(30) Foreign Application Priority Data

Apr. 12, 2006   (JP)   .............................. 2006-109829

(51) Int. Cl.
*G01K 13/02* (2006.01)
*G01K 1/08* (2006.01)
*G01K 7/00* (2006.01)
*G01F 1/68* (2006.01)

(52) U.S. Cl. .................. 374/138; 374/45; 374/206; 374/148; 374/183; 73/202.5; 73/204.21; 73/204; 73/22; 73/204.25

(58) Field of Classification Search ............... 374/45, 374/208, 138, 148, 183; 73/202.5, 204.21, 73/204.22, 204.25
See application file for complete search history.

(56) References Cited

U.S. PATENT DOCUMENTS

| | | | |
|---|---|---|---|
| 5,696,321 A * | 12/1997 | Igarashi et al. ............. 73/202.5 |
| 5,780,735 A * | 7/1998 | Kadohiro et al. ........... 73/202.5 |
| 5,789,673 A * | 8/1998 | Igarashi et al. ............. 73/202.5 |
| 5,892,146 A * | 4/1999 | Kobayashi et al. ........ 73/114.34 |
| 6,223,594 B1 | 5/2001 | Takiguchi et al. |
| 6,619,114 B1 * | 9/2003 | Lenzing et al. ............. 73/202.5 |
| 6,918,295 B1 * | 7/2005 | Shajii et al. ................ 73/202.5 |
| 6,983,653 B2 * | 1/2006 | Iwaki et al. ............... 73/204.23 |
| 2001/0037678 A1 * | 11/2001 | Kamiya ................... 73/204.22 |
| 2003/0182999 A1 * | 10/2003 | Kouno ..................... 73/204.21 |
| 2003/0196486 A1 * | 10/2003 | Zurek et al. ................ 73/202.5 |
| 2004/0003659 A1 * | 1/2004 | Kato et al. ..................... 73/202 |
| 2005/0241389 A1 | 11/2005 | Kitahara et al. |
| 2006/0059985 A1 * | 3/2006 | Seki et al. ................... 73/202.5 |
| 2007/0056363 A1 * | 3/2007 | Ban et al. ................... 73/118.2 |
| 2007/0125167 A1 * | 6/2007 | Kitahara .................... 73/202.5 |
| 2007/0125168 A1 * | 6/2007 | Kouno et al. ............. 73/204.16 |
| 2007/0256493 A1 * | 11/2007 | Okamoto et al. ......... 73/204.11 |
| 2008/0159354 A1 * | 7/2008 | Fleming et al. ............. 374/138 |

OTHER PUBLICATIONS

Chinese Official Action dated Mar. 28, 2008, issued counterpart Chinese Application No. 200710096524.5 with English translation.
Chinese Official Action dated Oct. 31, 2008 issued in corresponding Chinese application No. 2007100965245 with translation.

* cited by examiner

*Primary Examiner*—Gail Verbitsky
*Assistant Examiner*—Mirellys Jagan
(74) *Attorney, Agent, or Firm*—Nixon & Vanderhye PC (57) ABSTRACT

A thermal flow detecting apparatus detects fluid flow in a main flow passage. A bypass passage portion is provided through which some fluid bypasses the main flow passage. A detecting element is provided in the bypass passage portion and arranged at a location eccentrically displaced from the center of a cross section of the bypass passage portion. A throttle portion is provided upstream of the eccentric detecting element in the bypass passage portion for throttling the cross section partially on a side of the detecting element.

22 Claims, 4 Drawing Sheets

Detecting Element 31 is Eccentric to C$_L$

THERMAL FLOW DETECTING APPARATUS AND METHOD FOR DETECTING FLOW USING THE SAME

CROSS REFERENCE TO RELATED APPLICATIONS

This application is based on and incorporates herein by reference Japanese Patent Application No. 2006-109829 filed on Apr. 12, 2006.

FIELD OF THE INVENTION

The present invention relates to a thermal flow detecting apparatus having a throttle passage for detecting a fluid flow. The present invention further relates to a method for detecting the fluid flow using the thermal flow detecting apparatus.

BACKGROUND OF THE INVENTION

U.S. Pat. No. 6,223,594 B1 (JP-A-11-118559) discloses a thermal flow detecting apparatus for detecting airflow in an airflow passage. The flow detecting apparatus is a thermal flow meter for detecting airflow using a thermal resistive element as a hot wire.

Figure 5:
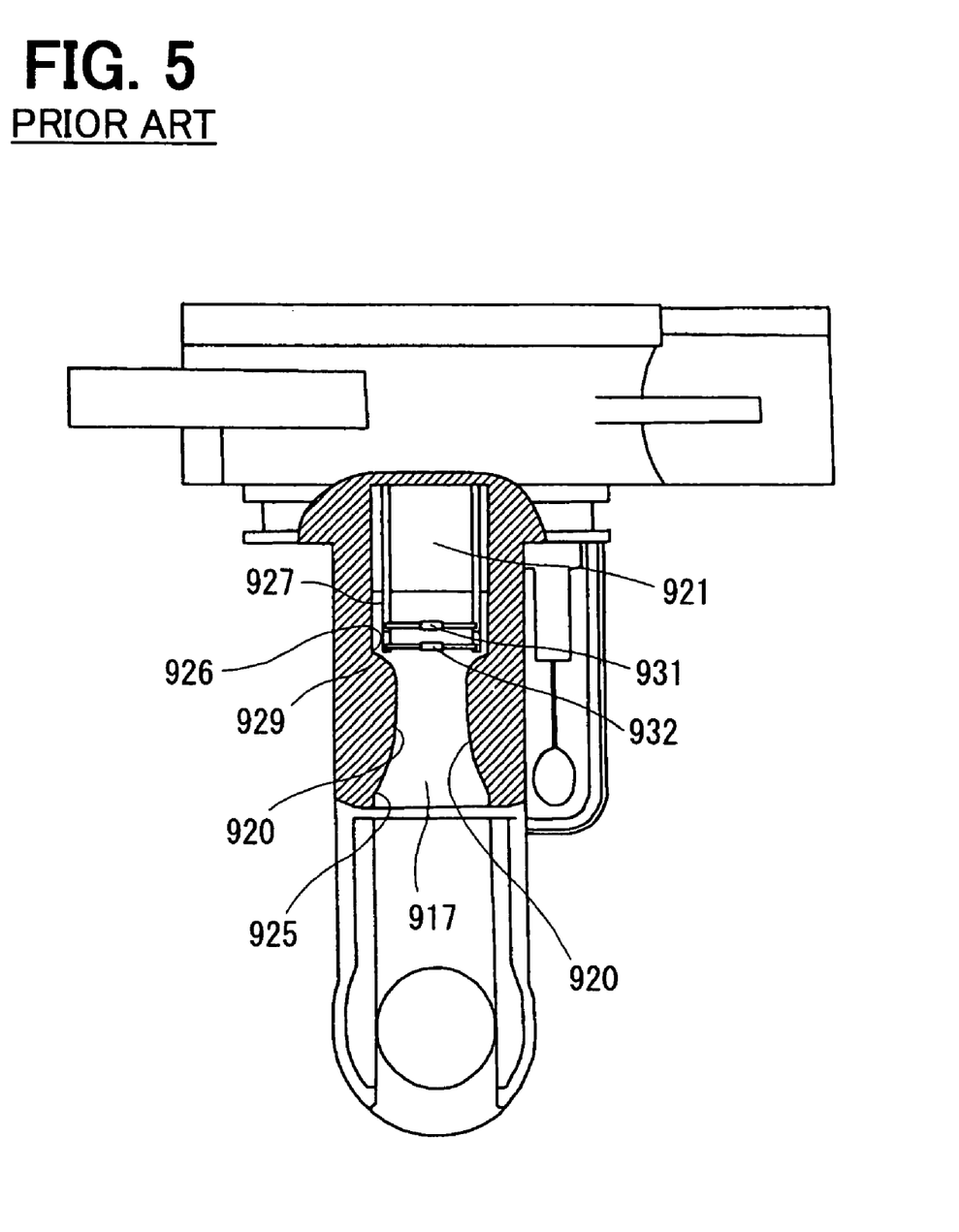
FIG. 5 is a partially sectional front view showing a flow meter according to a prior art.

As shown in FIG. 5, a conventional flow meter has an inner wall defining a bypass passage portion 917 being rectangular in cross section. The inner wall of the flow meter is provided partially with throttle portions 920 on both sides of the bypass passage portion 917. Each of the throttle portions 920 extends from an inlet end 925 toward an outlet end 926 with respect to the flow direction of the air. The outlet end 926 defines a throttle outlet cavity 921. Support members 927, 929 are provided in the throttle outlet cavity 921. Each of the support members 927, 929 is behind the corresponding throttle portion 920 defining a throttle surface in a convex surface when being viewed from an inlet of the throttle portions 920. A thermal resistive element 931 and a temperature sensing element 932 are provided in the bypass passage portion 917. The thermal resistive element 931 and the temperature sensing element 932 are supported using the support members 927, 929.

In this structure, the throttle portions 920 are capable of deflecting air, which passes through the bypass passage portion 917, from the support members 927, 929. The airflow can be smoothly rectified, so that the flow meter is capable of steadily detecting the airflow thereby outputting a stable detection signal. The flow meter has a thermal sensing element including the thermal resistive element 931 and the temperature sensing element 932 to measure the rectified airflow throughout a wide range between a small flow rate and a large flow rate, thereby transmitting the output signal indicating the airflow. In this structure, fluctuation in the output signal of the thermal sensing element can be reduced by rectifying the airflow.

The bypass passage portion 917 of the flow meter is inserted into the airflow passage to detect the airflow through the airflow passage. When the diameter of the bypass passage portion 917 is large, the bypass passage portion 917 causes large pressure drop in the airflow passage. Therefore, the diameter of the bypass passage portion 917 is preferably reduced to decrease pressure drop in the airflow passage. However, when the bypass passage portion 917 is reduced in inner diameter, a space for accommodating the thermal sensing element including the thermal resistive element 931 and the temperature sensing element 932 becomes small. The bypass passage portion 917 has therein a center portion where speed of airflow is substantially stable. In a structure in which the bypass passage portion 917 is reduced in inner diameter, the thermal sensing elements are hard to be arranged in the center of the bypass passage portion 917. Consequently, detection property of the flow meter may change when dispersion occurs in the position of the thermal sensing elements.

The airflow in the bypass passage portion 917 forms a flow distribution perpendicularly to the direction of the airflow. The flow speed of air is high in the vicinity of the center of the bypass passage portion 917 in the flow distribution. The flow speed of air is substantially constant, i.e., flat in the vicinity of the center of the bypass passage portion 917 in the flow distribution. Therefore, the flow speed of air does not greatly change around the center of the bypass passage portion 917 in the flow distribution.

In this structure, the thermal sensing element including the thermal resistive element 931 and the temperature sensing element 932 are preferably arranged in the vicinity of the center of the bypass passage portion 917 for detecting the flow rate of air. When the thermal sensing element is arranged in the vicinity of the bypass passage portion 917, the detection signal of the thermal sensing element does not greatly disperse, even when the position of the thermal sensing element slightly deviates from specific positions. However, when the diameter of the bypass passage portion 917 is reduced, the thermal sensing element may be originally arranged respectively in designated positions eccentrically displaced from the center of the bypass passage portion 917. In this structure, for example, when the thermal sensing element is slightly misaligned from the designated positions during assembly, dispersion in the detection signals becomes large compared with the structure in which the thermal sensing element is arranged in the center of the bypass passage portion 917. Accordingly, small misalignments of the thermal sensing element cause large dispersion in the detection property of the flow meter.

SUMMARY OF THE INVENTION

The present invention addresses the above disadvantage. According to one aspect of the present invention, a thermal flow detecting apparatus, for detecting fluid flow in a flow passage, includes a bypass passage portion defining therein a bypass passage through which fluid bypasses the flow passage. The thermal flow detecting apparatus further includes a detecting element that is provided in the bypass passage portion. The detecting element is arranged at a location eccentrically displaced from a center of a cross section of the bypass passage portion. The thermal flow detecting apparatus further includes a throttle portion provided upstream of the detecting element in the bypass passage portion for throttling the cross section partially on a side of the detecting element.

According to another aspect of the present invention, a method for detecting fluid flow in a flow passage includes introducing of fluid flow partially into a bypass passage distributed from the flow passage. The method further includes deflecting of the fluid flow toward a thermal resistive element, which is eccentrically displaced from a center of a cross section of the bypass passage, by partially throttling the cross section on a side of the thermal resistive element upstream of the thermal resistive element. The method further includes detecting of the fluid flow using the thermal resistive element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figures 1, 1A:
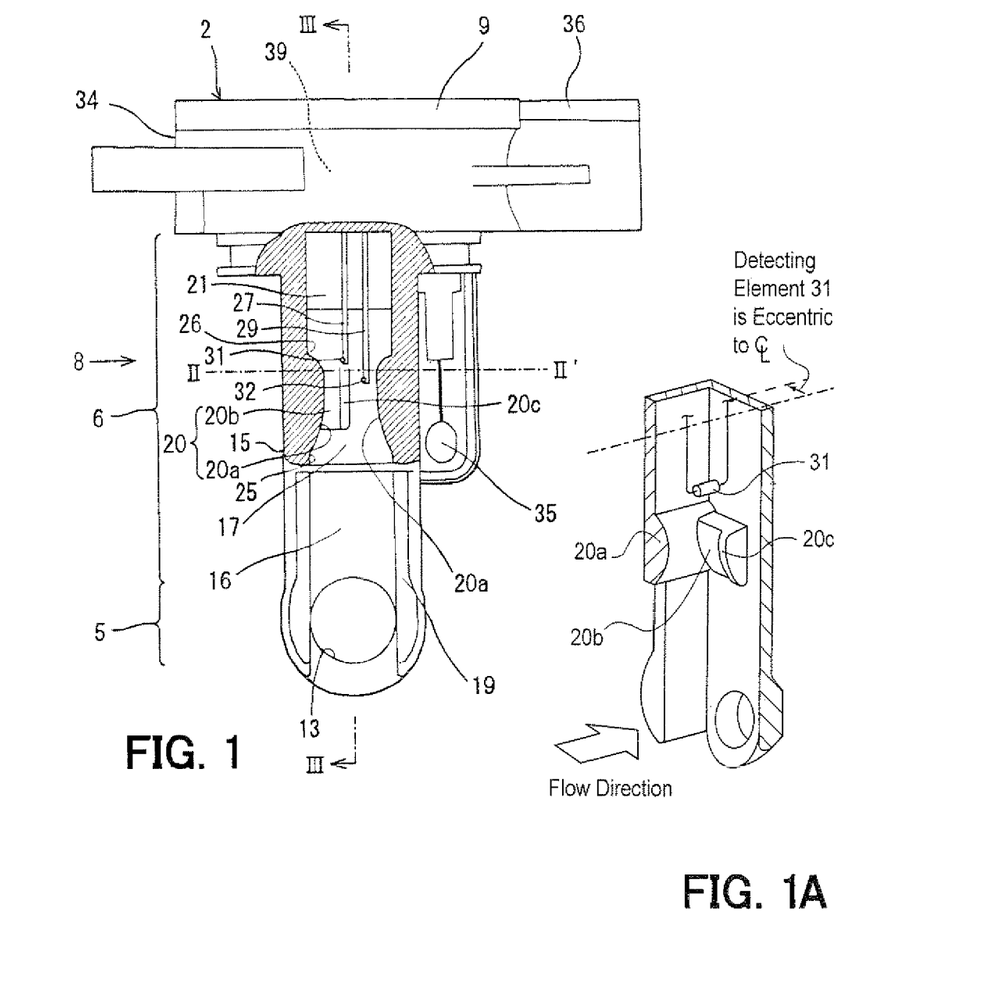
FIG. 1 is a partially sectional front view showing a flow meter provided with throttle portions and a thermal resistive element.
FIG. 1A is a perspective view of the throttle portions 20a and 20b shown in FIGS. 1, 3 and 4.
Figure 3:
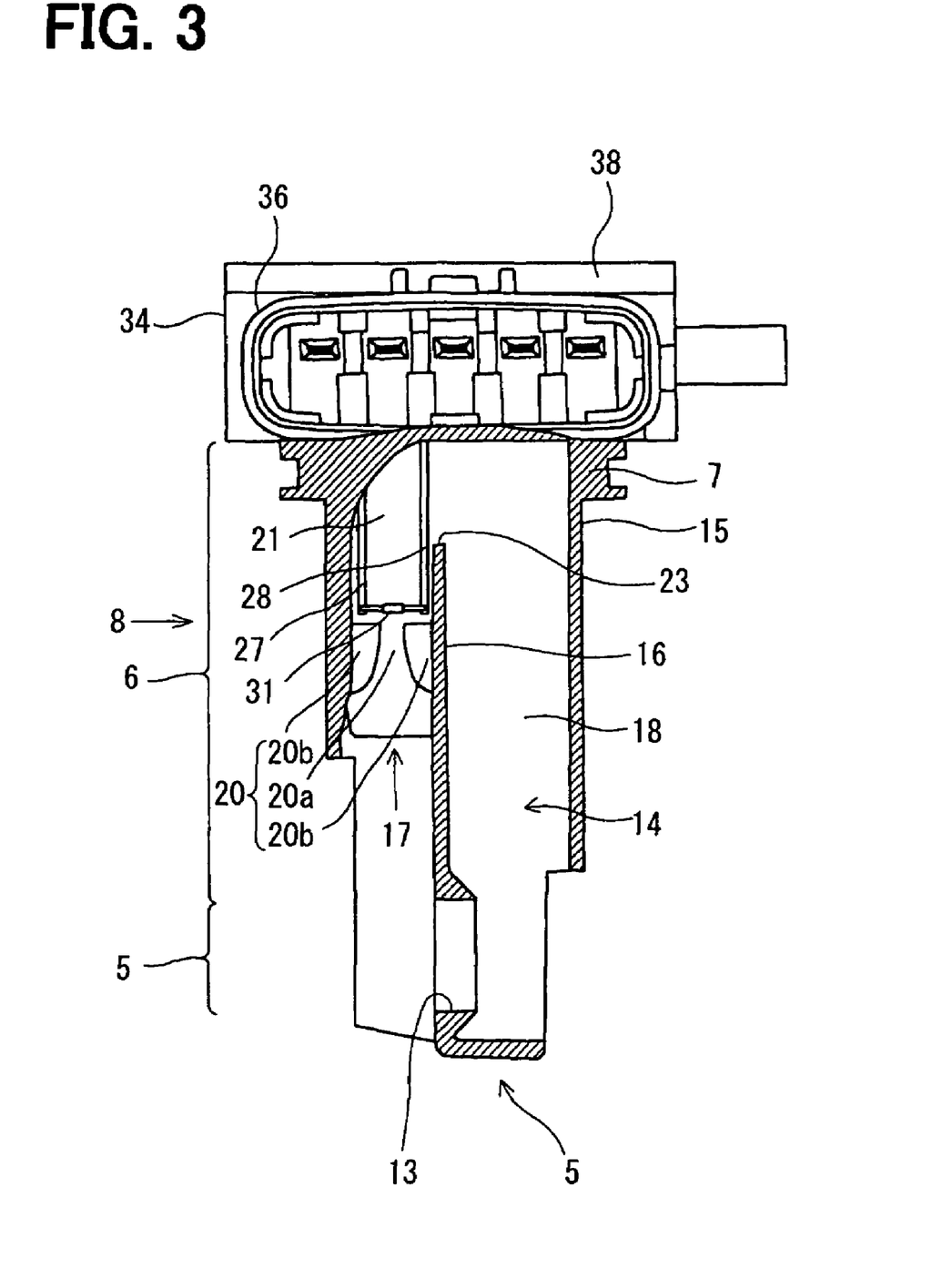
FIG. 3 is a partially sectional lateral view showing the flow meter provided with the throttle portions.
Figure 4:
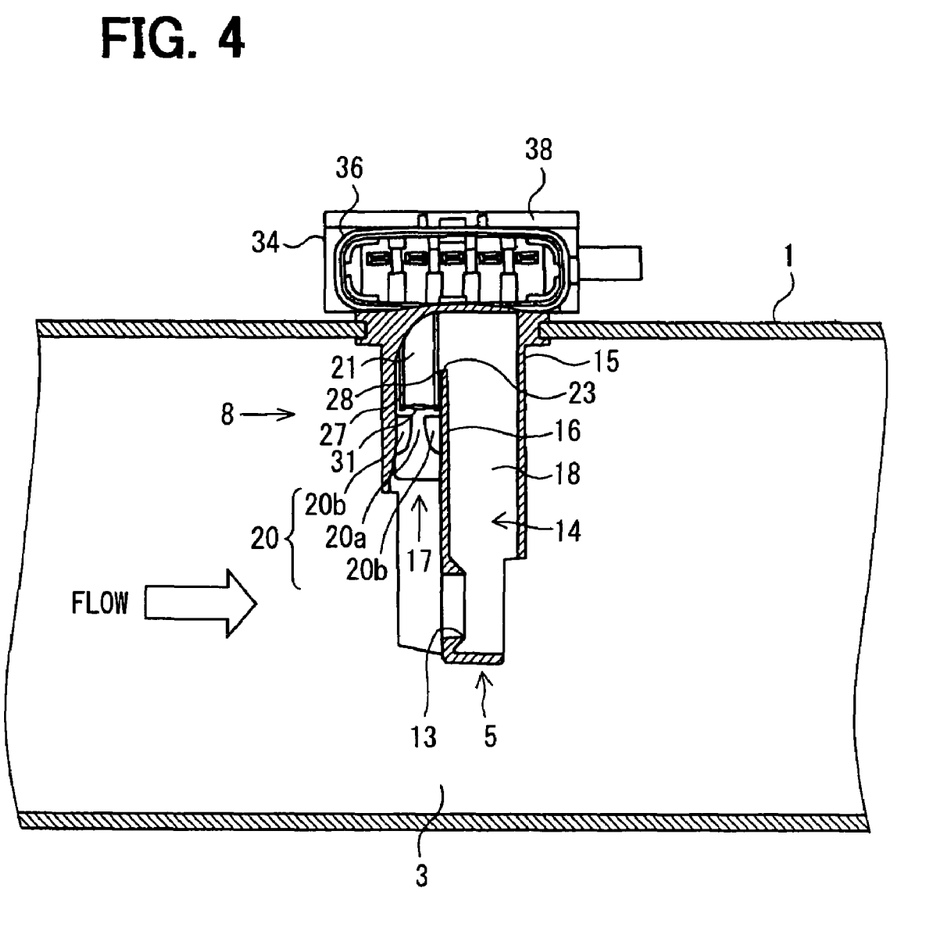
FIG. 4 is a partially sectional front view showing the flow meter mounted to a pipe defining therein an airflow passage.

As shown in FIGS. 1, 3, 4, a flow detecting apparatus (flow meter) 2 is applied to, for example, an internal combustion engine for detecting flow rate of intake air passing through an intake pipe 1 of the engine. The flow meter 2 is inserted into the intake pipe 1. The flow meter 2 is constructed of a mount portion 7, a venturi passage portion 5, a bypass passage portion 6, a sensing portion (fluid detecting element, thermal resistive element), and a circuit module 9.

The flow meter 2 is inserted into a plug-in hole of the intake pipe 1, so that the flow meter 2 is connected to the intake pipe 1 via the mount portion 7. The mount portion 7 is formed of, for example, resin integrally with the venturi passage portion 5 and the bypass passage portion 6. The venturi passage portion 5 is located in a substantially center of an airflow passage 3 defined in the intake pipe 1. The venturi passage portion 5 defines therein a venturi passage 13. Intake air passing through the intake pipe 1 partially flows into the venturi passage 13. The venturi passage portion 5 has an inner wall defining the venturi passage 13. The inner wall of the venturi passage portion 5 is substantially in parallel with the airflow passage 3 extending along the axis of the intake pipe 1.

The mount portion 7 is connected with the venturi passage portion 5 via the bypass passage portion 6. The bypass passage portion 6 serves as a connecting portion. The bypass passage portion 6 is formed of, for example, resin integrally with the mount portion 7 and the venturi passage portion 5. The bypass passage portion 6 includes an outer pipe 15 and a partition wall 16. The outer pipe 15 is in a substantially cylindrical shape. The outer pipe 15 has therein the partition wall 16. The outer pipe 15 therein defines a bypass passage 14, which is partitioned by the inner wall of the outer pipe 15 and the partition wall 16. The bypass passage 14 is in a substantially U-shape. The bypass passage 14 has an axial section in a substantially rectangular shape. The partition wall 16 defines an inlet bypass passage (bypass passage) 17 in the upstream thereof. The partition wall 16 has an upper end 23. The upper end 23 defines an outlet bypass passage 18 in the downstream of the partition wall 16.

A sensing portion 8 is provided between throttle portions 20a, 20b and a throttle outlet cavity 21. The sensing portion 8 is constructed of four support members 27, 28, 29, 30, a thermal resistive element 31, and a temperature sensing element 32. The thermal resistive element 31 serves as a flow detecting element.

The thermal resistive element 31 is arranged in the inlet bypass passage 17. The thermal resistive element 31 is located slightly downstream of the temperature sensing element 32. Each of the thermal resistive element 31 and the temperature sensing element 32 is a substantially bar-shaped member including a resistive element having both ends from which wiring members extend. Each of the thermal resistive element 31 and the temperature sensing element 32 is oriented substantially perpendicularly to a flow direction of air in the bypass passage 14. That is, each of the thermal resistive element 31 and the temperature sensing element 32 is oriented substantially along a flow direction of air in the airflow passage 3 (FIG. 4). The thermal resistive element 31 and the temperature sensing element 32 are substantially in parallel with each other when being viewed from the flow direction of air in the bypass passage 14.

The thermal resistive element 31 is arranged in the vicinity of the center in the cross section of the inlet bypass passage 17. Alternatively, the thermal resistive element 31 slightly deviates from the center line III-III in the cross section of the inlet bypass passage 17. That is, the thermal resistive element 31 is arranged eccentrically relative to the center line III-III in the cross section of the inlet bypass passage 17. Specifically, the thermal resistive element 31 is eccentrically displaced slightly from the center in the cross section of the inlet bypass passage 17, such that the thermal resistive element 31 is arranged slightly on the left side of line III-III in FIG. 1, i.e., arranged backward relative to the paper surface in FIG. 3.

The thermal resistive element 31 may be eccentrically displaced slightly from the center of the inlet bypass passage 17, when the cross section of the inlet bypass passage 17 is reduced to decrease pressure drop caused in the airflow passage 3 to which the flow meter is provided. In this structure, the thermal resistive element 31 and the temperature sensing element 32 may need to be eccentrically displaced from the center of the inlet bypass passage 17 because of constraints of manufacturing when, for example, the cross section of the inlet bypass passage 17 is possibly reduced.

Both ends of the thermal resistive element 31 are supported by free ends of the support members 27, 28. Both ends of the temperature sensing element 32 are supported by free ends of the support members 29, 30. Each of the support members 27, 28, 29, 30 has a fixed end secured to the inner wall of the mount portion 7, thereby also serving as a wiring member connecting one of the thermal resistive element 31 and the temperature sensing element 32.

The throttle portions 20a, 20b protrude from both the inner walls of the outer pipe 15, such that the throttle portions 20a, 20b reduce the sectional area of the inlet bypass passage 17. The throttle portions 20a, 20b construct a throttle member 20. The throttle portions 20a throttle the cross section of the inlet bypass passage 17 from the right side and the left side in FIG. 1. The throttle portions 20b throttle the cross section of the inlet bypass passage 17 from the right side and the left side in FIG. 3. The throttle portions 20b are provided to adjust the flow distribution of air in accordance with the position of the thermal resistive element 31 eccentrically displaced from the center of the inlet bypass passage 17.

The throttle member 20 protrudes toward the center of the inlet bypass passage 17 in the range between an inlet end 25 and an outlet end 26 in the inlet bypass passage 17. In this structure, the axial section of the inlet bypass passage 17 is gradually reduced from the upstream of the throttle member 20 toward the downstream of the throttle member 20. The axial section of the inlet bypass passage 17 has a minimum section in the throttle member 20, and drastically increases downstream of the minimum section of the throttle member 20 in the inlet bypass passage 17. The throttle portions 20a throttle, i.e., reduce the cross section of the inlet bypass passage 17 substantially uniformly across the width of the passage. The throttle portion 20b throttles substantially half of the cross section of the inlet bypass passage 17 on the side in which the thermal resistive element 31 deviates from the center of the inlet bypass passage 17, i.e., on the side in which the thermal resistive element 31 is eccentrically displaced in the inlet bypass passage 17 (e.g., see the perspective view in FIG. 1A). That is, the throttle portion 20b throttles substantially half of the cross section of the inlet bypass passage 17 on the left side in FIG. 1, i.e., backward relative to the paper surface in FIG. 3.

The throttle outlet cavity 21 is located downstream of the outlet end 26 in the inlet bypass passage 17. The throttle outlet cavity 21 has a normal effective area of the bypass passage 14. The throttle outlet cavity 21 extends to the upper end 23 of the partition wall 16. The downstream of the upper end 23 is connected with the outlet bypass passage 18. The outlet bypass passage 18 extends from the mount portion 7 toward the venturi passage portion 5 to have an effective area, which is substantially uniform therein. The outlet bypass passage 18 has the end communicating with the venturi passage 13.

The support members 27, 28 are substantially behind a throttle partition 20c when being viewed from the upstream of the inlet bypass passage 17 toward the opening downstream of the inlet bypass passage 17. In this structure, air flows from the outlet end 26 in the inlet bypass passage 17 into the throttle outlet cavity 21 after passing through the throttle member 20 of the inlet bypass passage 17, so that the airflow can be restricted from causing turbulence therein. Thus, the airflow can be rectified, i.e., stabilized.

The circuit module 9 includes a circuit portion and a thermistor 35. The thermistor 35 serves as a temperature measuring element for detecting temperature of air passing through the airflow passage 3. The circuit portion includes a housing 34, a control circuit 39, a radiator plate, a connector 36, and a cover 38. The circuit portion controls electricity supplied to the thermal resistive element 31 and the temperature sensing element 32. The control circuit 39 is provided in the housing 34 of the circuit portion for outputting a detection signal indicating the flow rate of the air. The housing 34 is formed of resin, for example.

As follows, the airflow and the flow meter 2 are described. The outer pipe 15 of the flow meter 2 has an inlet 19. Air passing through the intake pipe 1 partially flows into the inlet 19 of the outer pipe 15. The air flowing into the inlet 19 is split into one airflow passing through the venturi passage 13 and another airflow passing through the inlet bypass passage 17.

The one airflow passing through the venturi passage 13 becomes high in flow speed downstream the venturi passage 13, thereby generating negative pressure. The negative pressure caused downstream the venturi passage 13 attracts air passing through the outlet bypass passage 18. Thus, the airflow passing from the inlet bypass passage 17 into the bypass passage 14 becomes high in flow speed.

The control circuit 39 controls electricity supplied to the thermal resistive element 31, such that difference between temperature of the thermal resistive element 31 and temperature of the airflow passing through the bypass passage 14 becomes substantially constant. Specifically, the control circuit 39 controls electricity supplied to the thermal resistive element 31 such that the difference between the temperature of the thermal resistive element 31 and temperature of air becomes substantially constant. The temperature of air is detected using the temperature sensing element 32. The temperature of the thermal resistive element 31 can be calculated in accordance with an amount of the electricity supplied to the thermal resistive element 31. Thus, the control circuit 39 outputs a flow detection signal indicating the amount of the electricity corresponding to the flow rate of air.

In this embodiment, the airflow enters the inlet bypass passage 17, and passes through the throttle portions 20a, thereby being rectified therethrough. The airflow is partially accelerated by passing through the throttle portions 20b, so that the airflow is partially increased in flow speed on the side of the throttle portions 20b. Thus, distribution of the airflow can be properly controlled.

Figure 2A:
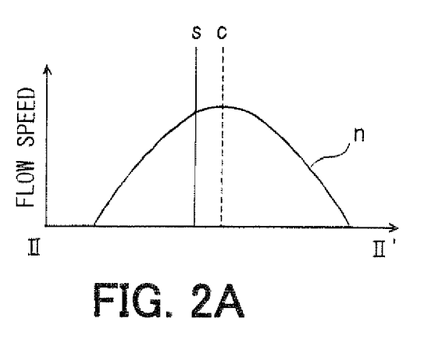
FIG. 2A is a graph showing a flow distribution in the vicinity of a thermal resistive element in a flow meter, which is not provided with the throttle portions.

As shown in FIG. 2A, when the throttle portions 20b are not provided, the airflow shows a flow distribution n, which is substantially symmetric relative to the cross section taken along the line II'-II' in FIG. 1. In this substantially symmetric flow distribution n, flow speed in the center c is highest, and the position s, at which the thermal resistive element 31 is located, deviates from the center c, in which the flow speed is highest. As a result, when the position s, at which the thermal resistive element 31 is located, deviates even slightly from a designated position, the detection signal indicating the flow rate greatly changes.

Figure 2B:
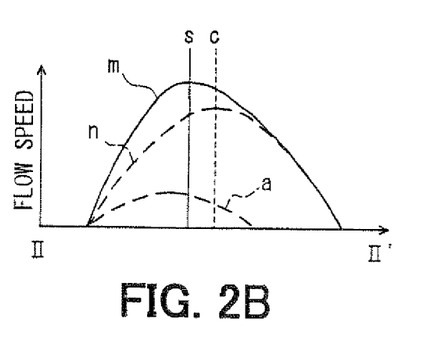
FIG. 2B is a graph showing a flow distribution in the vicinity of the thermal resistive element in the flow meter, which is provided with the throttle portions.

By contrast, in this embodiment, the throttle portions 20b are provided. In this structure, as shown in FIG. 2B, the flow distribution becomes asymmetric relative to the cross section taken along the line II'-II' in FIG. 1. In this structure, the throttle portions 20b generate an enhanced flow component a, and this enhanced flow component a is added to the substantially symmetric flow distribution n, which is formed in the structure in which the throttle portions 20b are not provided. Thus, a flow distribution m is formed by adding the enhanced flow component a to the substantially symmetric flow distribution n. In this flow distribution m, the flow speed is highest substantially at the position s, in which the thermal resistive element 31 is located, so that variation in the flow speed is small in the vicinity of the position s. Consequently, in this embodiment, even when the position s deviates from the designated position, change in the detection signal becomes small, compared with the structure, in which the throttle portions 20b are not provided.

In this embodiment, the throttle portions 20a increase the speed of the airflow, so that the detection accuracy of the flow rate can be enhanced. In addition, the flow distribution can be properly formed in accordance with the position, at which the thermal resistive element 31 is located, by providing the throttle portions 20b. Thus, the characteristic of the flow meter can be restricted from causing fluctuation caused by misalignment of the thermal resistive element 31.

Furthermore, the throttle partition 20c substantially partitions the portion, in which each of the throttle portions 20b is provided, from the portion, in which each of the throttle portions 20b is not provided. In this structure, effect of the throttle portions 20b can be enhanced, so that the flow distribution can be rectified with a small amount of throttle. Thus, pressure drop caused by the throttle portions 20b can be reduced.

The number of the throttle portions 20b is not limited to two. The number of the throttle portions 20b may be one. The number of the throttle portions 20a is not limited to two. The number of the throttle portions 20a may be one.

In the above embodiment, the flow detecting apparatus is provided for detecting air flowing in the airflow passage 3. The flow detecting apparatus includes the bypass passage portion 6 provided such that airflow bypasses the airflow passage 3 through the bypass passage portion 6. The flow detecting apparatus further includes the detecting element (thermal resistive element) 31 that is provided in the bypass passage portion 6. The thermal resistive element 31 is arranged at the location eccentrically displaced from the center of the cross section of the bypass passage portion 6. That is, the thermal resistive element 31 is arranged at the location deviating from the center of the cross section of the bypass passage portion 6. The flow detecting apparatus further includes the at least one throttle portion 20b provided upstream of the sensing portion 8 in the bypass passage portion 6 for throttling the cross section of the bypass passage portion 6 partially on the side of the sensing portion 8 eccentrically displaced from the center of the cross section of the bypass passage portion 6.

For example, the bypass passage portion 6 may be reduced in diameter to decrease pressure drop caused in the airflow passage 3. In this case, when the thermal resistive element is hard to be arranged in the center of the cross section of the bypass passage portion 6, the thermal resistive element may be arranged in the location eccentrically displaced from the center of the cross section of the bypass passage portion 6. In the above embodiment, the thermal resistive element is arranged in the location deviating from, i.e., being eccentrically displaced from the center of the bypass passage portion 6. Even in this structure, the sensing property of the airflow can be maintained, even when the position of the thermal resistive element is misaligned because of dispersion from the designated position of the thermal resistive element in manufacturing of the flow meter 2.

Specifically, the throttle portion 20b is provided upstream of the thermal resistive element, so that the flow speed is enhanced locally in the bypass passage portion 6. The airflow can be deflected in the bypass passage portion 6 to bias the flow distribution toward the thermal resistive element 31 eccentrically displaced in the bypass passage portion 6. Consequently, fluctuation in detection accuracy caused by misalignment of the thermal resistive element 31 can be reduced, similarly to the structure in which the thermal resistive element 31 is arranged in the center of the bypass passage portion 6. The throttle portion 20b is provided to deflect the airflow toward the thermal resistive element 31 eccentrically displaced in the cross section of the bypass passage portion 6. In this structure, the flow speed of air can be enhanced in the direction eccentrically toward the thermal resistive element 31. Therefore, the flow distribution can be formed around the position, in which the thermal resistive element 31 is arranged, so that the position of the thermal resistive element 31 can be defined as the center of the flow distribution. Consequently, fluctuation in sensing characteristic can be reduced, similarly to the structure in which the thermal resistive element 31 is arranged in the center of the bypass passage portion 6.

In the above embodiment, the throttle portion 20b throttles the bypass passage portion 6 in the vicinity of the wall surface defining the bypass passage portion 6. In this structure, the throttle portion 20b is capable of sufficiently producing effect for controlling the flow distribution, even when the amount of throttle is not necessarily large to generate large flow resistance therein.

In the above embodiment, the throttle portion 20b throttles in the vicinity of the wall surface defining the bypass passage portion 6. Furthermore, the throttle portion 20b throttles the cross section of the bypass passage portion 6 partially on the side of the sensing portion 8 eccentrically displaced from the center of the cross section of the bypass passage portion 6.

The bypass passage portion 6 can be defined by a U-shaped member having one end in which the inlet bypass passage portion 17 is connected with the outlet bypass passage portion 18.

Further, the flow meter 2 further includes the temperature sensing element 32 arranged in the bypass passage portion 6. The temperature sensing element 32 is provided at the location deviating from the location, in which the thermal resistive element 31 is provided in the bypass passage portion 6.

In the above embodiment, the flow meter 2 is capable of producing the following effect. The flow distribution can be properly formed in the bypass passage portion 6 in accordance with the location, in which the thermal resistive element 31 is arranged. In addition, even when the location of the thermal resistive element 31 disperses, variation in the measurement characteristic of the flow meter 2 can be reduced.

In the above embodiments, the flowmeter is used for measuring the flow rate of air. However, the flowmeter is not limited to measure the flow rate of air. The flowmeter can be applied to detect flow rate of any other fluid such as exhaust gas of a vehicle.

Various modifications and alternations may be diversely made to the above embodiments without departing from the spirit of the present invention.

What is claimed is:

1. A thermal flow detecting apparatus for detecting fluid flow in a flow passage, the thermal flow detecting apparatus comprising:
   a bypass passage portion defining therein a bypass passage through which fluid bypasses the flow passage;
   a detecting element that is provided in the bypass passage portion, the detecting element having a longitudinal axis disposed perpendicularly to fluid flow through the bypass passage portion and eccentrically displaced from a center of a cross section of the bypass passage portion; and
   a throttle portion provided upstream of the detecting element in the bypass passage portion for throttling the cross section on a side of the eccentrically disposed detecting element and perpendicularly to the longitudinal axis,
   wherein the throttle portion is disposed on an internal wall of the bypass passage, the internal wall being perpendicular to the longitudinal axis, and
   the throttle portion is eccentrically disposed from the center of the cross section of the bypass passage.

2. The thermal flow detecting apparatus according to claim 1,
   wherein the bypass passage portion therein has a wall surface defining the bypass passage, and
   the throttle portion throttles the cross section of the bypass passage portion in the vicinity of the wall surface defining the bypass passage.

3. The thermal flow detecting apparatus according to claim 1,
   wherein the bypass passage portion therein has a wall surface defining the bypass passage,
   the throttle portion throttles the cross section of the bypass passage portion in the vicinity of the wall surface defining the bypass passage, and
   the throttle portion throttles the cross section of the bypass passage portion partially on the side of the detecting element eccentrically from the center of the cross section of the bypass passage portion.

4. The thermal flow detecting apparatus according to claim 1, further comprising:

a temperature sensing element arranged in the bypass passage portion,
wherein the temperature sensing element is provided at a location eccentrically displaced from the detecting element in the bypass passage portion.

5. The thermal flow detecting apparatus according to claim 1, wherein the throttle portion is located on the longitudinal axis of the detecting element.

6. The thermal flow detecting apparatus according to claim 1, further comprising:
a second throttle portion provided in the bypass passage portion,
wherein the second throttle portion extends in a perpendicular direction from said longitudinal axis.

7. The thermal flow detecting apparatus according to claim 1, further comprising:
a pair of second throttle portions provided in the bypass passage portion and opposed to each other,
wherein each of the pair of throttle portions extends in a perpendicular direction from said longitudinal axis.

8. The thermal flow detecting apparatus according to claim 1, wherein:
the internal wall has a non-throttling surface, which is not provided with a throttle portion and is eccentrically disposed from the center of the cross section of the bypass passage, and
the non-throttling surface is adjacent to the throttle portion in a direction perpendicular to both the longitudinal axis and the fluid flow.

9. The thermal flow detecting apparatus according to claim 8, further comprising:
a throttle partition that substantially partitions the throttle portion from the non-throttling surface.

10. The thermal flow detecting apparatus according to claim 9, wherein the non-throttling surface is in a substantially flat shape.

11. The thermal flow detecting apparatus according to claim 10, further comprising:
a temperature sensing element located in the bypass passage,
wherein the temperature sensing element is adjacent to and in parallel with the detecting element,
the temperature sensing element is located between the non-throttle surface and a wall surface portion of the bypass passage, the wall surface portion opposed to the non-throttle surface,
the non-throttle surface and the wall surface portions are perpendicular to the longitudinal axis, and
the wall surface portion is in a substantially flat shape.

12. A method for detecting fluid flow in a flow passage, the method comprising:
introducing fluid flow partially into a bypass passage distributed from the flow passage;
deflecting the fluid flow toward a thermal resistive element having a longitudinal axis disposed perpendicularly to fluid flow and eccentrically displaced from a center of a cross section of the bypass passage, by partially throttling the cross section selectively on a side of the thermal resistive element upstream of the eccentrically disposed thermal resistive element and perpendicularly to the longitudinal axis by using a throttle portion disposed on an internal wall of the bypass passage, the internal wall being perpendicular to the longitudinal axis, the throttle portion being eccentrically disposed from the center of the cross section of the bypass passage; and
detecting the fluid flow using the thermal resistive element.

13. The method according to claim 12, wherein the deflecting step includes:
throttling the fluid flow along the longitudinal axis only on a side of both the thermal resistive element and the throttle portion.

14. The method according to claim 12, wherein the deflecting step includes:
throttling the fluid flow along the longitudinal axis only on a side of both the thermal resistive element and the throttle portion, without throttling the fluid flow along the longitudinal axis on an adjacent side of the throttle portion in the internal wall.

15. The method according to claim 14, wherein the internal wall has a throttle partition substantially partitioning the throttle portion from a non-throttle surface.

16. A thermal flow detecting apparatus for detecting fluid flow in a flow passage, said apparatus comprising:
a bypass passage disposed to cause a portion of said fluid flow to pass therethrough;
a detecting element having a longitudinal axis disposed perpendicular to fluid flow through the bypass passage and eccentrically disposed from a center of the bypass passage;
at least one first throttle structure disposed upstream of the detecting element within said bypass passage and extending uniformly in parallel to said longitudinal axis along an internal wall of said bypass passage; and
at least one second throttle structure disposed upstream of the detecting element within said bypass passage and extending perpendicularly to said longitudinal axis along only a portion of an internal wall of said bypass passage, said portion also being eccentrically displaced from a center of the bypass passage in the same direction of displacement as the detecting element is eccentrically displaced,
wherein the at least one second throttle structure is disposed on the internal wall, which is perpendicular to the longitudinal axis of the detecting element, and
the at least one second throttle structure is eccentrically disposed from the center of the cross section of the bypass passage.

17. A thermal flow detecting apparatus as in claim 16, further comprising:
a throttle partition portion of said second throttle structure aligned with a support, and electrical connection for one end of the detecting element and extending into the bypass passageway at least as much as said aligned support and electrical connection.

18. A thermal flow detecting apparatus as in claim 16, wherein:
two of said first throttle structures are disposed opposite each other on opposing walls of a bypass passageway having a substantially rectilinear cross section; and
two of said second throttle structures are disposed opposite each other on other opposing walls of said bypass passageway.

19. A thermal flow detecting apparatus as in claim 18, wherein each of said second throttle structures includes a throttle partition portion respectively aligned with a support and electrical connection for one end of the detecting element and extending into the bypass passage at least as much as said aligned support and electrical connections.

20. A thermal flow detecting apparatus according to claim 16, wherein the internal wall with the at least one second throttle structure has a non-throttling surface, which is not provided with a throttle structure and which is eccentrically disposed from the center of the bypass passage, and
the non-throttling surface is adjacent to the at least one second throttle structure in a direction perpendicular to both said longitudinal axis and said fluid flow.

21. A thermal flow detecting apparatus according to claim 20, further comprising:
a throttle partition substantially partitioning the at least one second throttle structure from the non-throttling surface.

22. A thermal flow detecting apparatus according to claim 21, wherein the non-throttling surface is in a substantially flat shape.

* * * * *